US008982900B2

(12) United States Patent
Miller et al.

(10) Patent No.: US 8,982,900 B2
(45) Date of Patent: Mar. 17, 2015

(54) ROUTING AROUND INTRA-NETWORK ELEMENT DISCONNECTIVITY

(75) Inventors: Daniel Louis Miller, Plano, TX (US); Ladan Pickering, Plano, TX (US); Sanjay Gera, Plano, TX (US); Edward A. Harbin, Dallas, TX (US); Albert V. Smith, Jr., Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 13/456,133

(22) Filed: Apr. 25, 2012

(65) Prior Publication Data

US 2013/0287018 A1 Oct. 31, 2013

(51) Int. Cl.
*H04L 12/703* (2013.01)
*H04L 12/721* (2013.01)

(52) U.S. Cl.
CPC .............. *H04L 45/28* (2013.01); *H04L 45/12* (2013.01)
USPC .......................................... 370/422; 709/241

(58) Field of Classification Search
USPC ............................ 370/422–424; 709/239–244
See application file for complete search history.

(56) References Cited

U.S. PATENT DOCUMENTS

| 6,646,989 B1 * | 11/2003 | Khotimsky et al. | 370/238 |
| 7,376,086 B1 * | 5/2008 | Paraschiv | 370/237 |
| 7,554,981 B2 * | 6/2009 | Kecskemeti | 370/392 |
| 8,325,706 B2 * | 12/2012 | Pacella | 370/351 |
| 2011/0103263 A1 * | 5/2011 | Unbehagen et al. | 370/254 |
| 2011/0116376 A1 * | 5/2011 | Pacella et al. | 370/235 |

OTHER PUBLICATIONS

Direction assisted geographic routing for mobile ad hoc networks, Biao Zhou et al, 2008.*
Lee et al., "Wavelength Switched Optical Networks," Internet Engineering Task Force (IETF), Apr. 2011, pp. 1-52, <http://tools.ietf.org/html/rfc6163>.
Ebeling et al., "Scalable System Packet Interface (SPI-S)," Optical Internetworking Forum (OIF), Nov. 2006, pp. 1-44, <http://www.oiforum.com/public/documents/OIF-SPI-S-01.0.pdf>.
Dijkstra, "A Note on Two Problems in Connexion with Graphs," Numerische Mathematik 1, Jun. 1959, pp. 269-271.

* cited by examiner

*Primary Examiner* — Hoon J Chung
(74) *Attorney, Agent, or Firm* — Maschoff Brennan

(57) ABSTRACT

Routing around intra-network element (intra-NE) disconnectivity is described. The routing is performed on one or more network element (NEs) of a channelized network. The routing involves performing a shortest-path-search (SPS) to determine a shortest non-disconnected path from a single path-ingress edge to a single path-egress edge. The SPS includes classifying a set of endpoints of each NE in the channelized network as an equivalence class of endpoints, classifying a set of paths-so-far between each NE in the channelized network as an equivalence class of paths-so-far, grouping each equivalence class of paths-so-far by the equivalence class of endpoints that includes a terminal endpoint of the path-so-far that is furthest from the single path-ingress edge, and exploring separately each equivalence class of edges that are incident to each NE when determining the shortest non-disconnected path from the single path-ingress edge to the single path-egress edge.

19 Claims, 15 Drawing Sheets

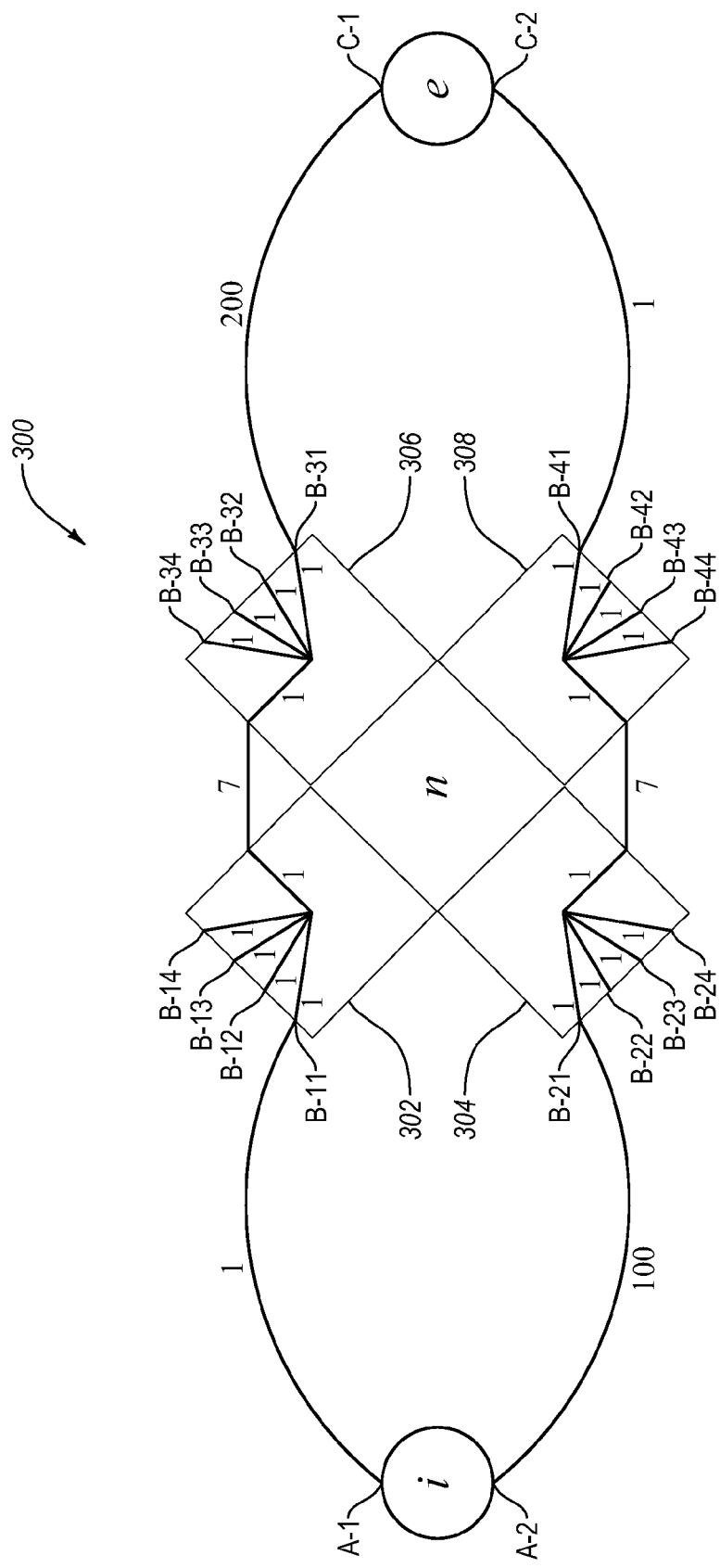

$P_{rhs} \equiv P_{right\text{-}hand\text{-}side\ end\ of\ B}$ $\leftarrow P_{lhs} \equiv P_{left\text{-}hand\text{-}side\ end\ of\ B} \rightarrow$

*Fig. 5C*

$$P_{rhs}\binom{idle}{\longleftrightarrow lhs}$$
← →

$\leftarrow P_{lhs}\binom{idle}{\longleftrightarrow rhs} \rightarrow$ $$\begin{array}{c}\begin{array}{|cccccccccccc|}\hline 1 & 0 & 1 & 0 & 1 & \cdots & 0 & 1 & 0 & 1 & 1 & 1 \\ 0 & 1 & 1 & 0 & 1 & \cdots & 0 & 1 & 1 & 0 & 1 & 1 \\ 1 & 0 & 0 & 0 & 1 & \cdots & 0 & 0 & 0 & 0 & 1 & 1 \\ 0 & 0 & 0 & 0 & 1 & \cdots & 1 & 0 & 1 & 0 & 1 & 1 \\ 0 & 0 & 1 & 0 & 1 & \cdots & 1 & 1 & 0 & 0 & 1 & 1 \\ 0 & 1 & 1 & 1 & 1 & \cdots & 1 & 1 & 1 & 0 & 1 & 1 \\ 0 & 0 & 0 & 1 & 1 & \cdots & 0 & 1 & 1 & 0 & 1 & 1 \\ 0 & 0 & 0 & 1 & 1 & \cdots & 0 & 0 & 0 & 0 & 1 & 1 \\ \vdots & \vdots & \vdots & \vdots & \vdots & \ddots & \vdots & \vdots & \vdots & \vdots & \vdots & \vdots \\ 1 & 1 & 1 & 0 & 1 & \cdots & 1 & 0 & 1 & 0 & 1 & 1 \\ 0 & 0 & 0 & 0 & 1 & \cdots & 1 & 0 & 0 & 0 & 1 & 1 \\ 1 & 1 & 0 & 0 & 1 & \cdots & 1 & 1 & 0 & 0 & 1 & 1 \\ 1 & 0 & 1 & 1 & 1 & \cdots & 0 & 0 & 1 & 1 & 1 & 1 \\ 1 & 1 & 0 & 0 & 1 & \cdots & 1 & 0 & 0 & 0 & 1 & 1 \\ 1 & 1 & 1 & 0 & 1 & \cdots & 0 & 0 & 0 & 1 & 1 & 1 \\ 1 & 0 & 0 & 1 & 1 & \cdots & 1 & 1 & 0 & 1 & 1 & 1 \\ 0 & 0 & 1 & 1 & 1 & \cdots & 0 & 0 & 0 & 0 & 1 & 1 \\ \hline\end{array}\end{array}$$

Fig. 5E $$\leftarrow P_{\text{lhs}}\left(\overset{\text{idle}}{\longleftrightarrow}\text{rhs}\right), \exists 0, \exists 1, \sim t, \equiv T, \equiv a, \equiv p, \equiv S \rightarrow$$

$$\begin{bmatrix} 1 & 1 & 0 & 1 & 0 & 1 & 1 \\ 1 & 1 & 1 & 0 & 1 & 0 & 1 \\ 0 & 0 & 0 & 1 & 0 & 1 & 0 \\ 1 & 0 & 1 & 0 & 0 & 0 & 1 \\ 0 & 1 & 1 & 0 & 1 & 1 & 0 \end{bmatrix} B \;\; \omega_{(t,T,a,p,S)}$$

$$\updownarrow P_{\text{rhs}}\left(\overset{\text{idle}}{\longleftrightarrow}\text{lhs}\right), \exists 0, \exists 1, \sim t, \equiv T, \equiv a, \equiv p, \equiv S$$

$\leftarrow \quad \rightarrow$

*Fig. 5F*

$\leftarrow P_{\text{lhs}}(\text{idle} \leftrightarrow \text{rhs}), \exists 0, \exists 1, \sim t, \equiv T, \equiv a, \equiv p, \equiv S \rightarrow$ $$\begin{bmatrix} 1 & 0 & 1 & 0 & 1 & 1 & 1 \\ 1 & 1 & 0 & 0 & 1 & 0 & 1 \\ 0 & 0 & 1 & 1 & 0 & 1 & 0 \\ 1 & 0 & 0 & 0 & 0 & 0 & 1 \\ 0 & 1 & 1 & 0 & 1 & 1 & 0 \end{bmatrix}_{B_{(T,t,a,p,S)}}$$

$\leftarrow P_{\text{rhs}}(\text{idle} \leftrightarrow \text{lhs}), \exists 0, \exists 1, \sim t, \equiv T, \equiv a, \equiv p, \equiv S \rightarrow$

Fig. 5G

$$\leftarrow P_{rhs}(\xleftrightarrow{idle} lhs), \exists 0, \exists 1, \sim t, \equiv T, \equiv a, \equiv p, \equiv S \rightarrow$$

$$\begin{bmatrix}
[1 & 0 & 1 & 0 & 1 & 1 & 1](p, \underbrace{B_{*ODU0*}}) \\
[1 & 0 & 1 & 0 & 1 & 1 & 1](p, \underbrace{B_{*ODU1*}}) \\
[1 & 0 & 1 & 0 & 1 & 1 & 1](p, \underbrace{B_{*ODU2*}}) \\
[1 & 0 & 1 & 0 & 1 & 1 & 1](p, \underbrace{B_{*ODUflex \times 1*}}) \\
\ldots \\
[1 & 0 & 1 & 0 & 1 & 1 & 1](p, \underbrace{B_{*ODUflex \times 27*}})
\end{bmatrix} \Big\} B_p$$

*Fig. 5H*

ROUTING AROUND INTRA-NETWORK ELEMENT DISCONNECTIVITY

FIELD

Example embodiments discussed herein are related to intra-network element disconnectivity.

BACKGROUND

As the communications world transforms, demand for bandwidth and high-quality multimedia services is escalating. Residential and business customers have rising expectations for various types of data and communications at ever increasing speeds. Ultimately, this shift in expectations challenges service providers to provide diverse, bandwidth-intensive services required by customers. The underlying network architecture must therefore be highly reliable, manageable, and scalable.

Modern telecommunications networks typically include various network elements (NEs) that are interconnected using electrical and/or optical data transmission lines. One such NE is an optical-transport switch. An optical-transport switch is typically made up of one or more confederated shelves with each shelf having multiple ingress and egress endpoints. Although each shelf is designed to be non-blocking, meaning that a data signal from any ingress endpoint of the shelf may be routed to any egress endpoint of the shelf, bandwidth constraints between shelves may often result in disconnectivity between an ingress endpoint of one shelf and an egress endpoint of another shelf.

Assuring the lack of disconnectivity within a NE, such as blocking, may be difficult and costly in terms of increased hardware and configuration efforts. Although various approaches have been effected, including approaches by the Optical Internetworking Forum (OIF), the Internet Engineering Task Force (IETF) Common Control and Measurement Plane working group (CCAMP), and the IETF wavelength switched optical networks (WSON) standardization effort within CCAMP, all currently effected approaches lack the ability to hierarchically classify resources by behavior traits, unnecessarily divide the NE for connectivity purposes, or tend to prune a NE as not having a viable intra-network element (intra-NE) path while a viable intra-NE path actually exits.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, each network element (NE) of a channelized network includes one or more internally non-blocking switch-fabrics each having a plurality of endpoints with interconnects between any two internally non-blocking switch-fabrics. A method for performing a shortest-path-search (SPS) to determine the shortest non-disconnected path in the channelized network from a single path-ingress edge to a single path-egress edge through one or more of the NEs includes classifying a set of endpoints of each NE in the channelized network as an equivalence class of endpoints, classifying a set of paths-so-far between each NE in the channelized network as an equivalence class of paths-so-far, grouping each equivalence class of paths-so-far by the equivalence class of endpoints that includes a terminal endpoint of the path-so-far that is furthest from the single path-ingress edge, and exploring separately each equivalence class of edges that are incident to each NE when determining the shortest non-disconnected path from the single path-ingress edge to the single path-egress edge.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Example embodiments will be described and explained with additional specificity and detail through the use of the accompanying drawings in which:

FIG. 3 schematically illustrates another example operating environment including another example NE in which embodiments of a method for routing around intra-NE disconnectivity may be effected;

FIGS. 5A-5H illustrate a process flow for communicating a compacted declaration of capabilities of an NE using link-state advertisements (LSAs) for use in an example method for routing around intra-NE disconnectivity;

DESCRIPTION OF EMBODIMENTS

Some embodiments described herein include methods for routing around intra-network element (intra-NE) disconnectivity. The methods for routing around intra-NE disconnectivity accomplish routing through one or more network elements (NEs) while enabling the ability to hierarchically classify resources by behavior traits, without unnecessarily dividing any NE for connectivity purposes, and without prematurely pruning any NE as not having a viable intra-NE path while a viable intra-NE path actually exits.

Embodiments of the present invention will be explained with reference to the accompanying drawings.

Figure 1:
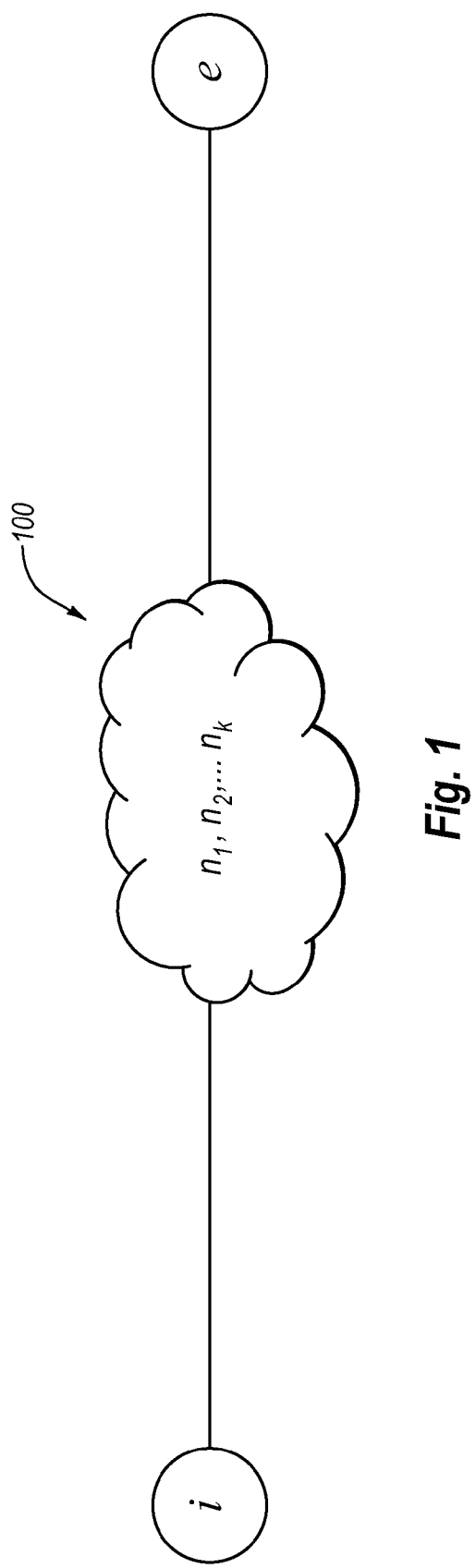
FIG. 1 schematically illustrates an example operating environment in which embodiments of a method for routing around intra-network element (intra-NE) disconnectivity may be effected.

FIG. 1 schematically illustrates an example operating environment 100 in which embodiments of a method for routing around intra-NE disconnectivity may be effected. The example operating environment 100 includes an ingress endpoint i, one or more intermediary network elements n, and an egress endpoint e. For example, where the example operating environment 100 is a telecommunications network, the ingress endpoint i may be an ingress endpoint of a telephone of a user making a call and the egress endpoint e may be an egress endpoint of a telephone of a user receiving the call, while each of the intermediary network elements n may be an optical-transport switch that includes a centralized OTN, SONET/SDH, and WDM/WSOM switch fabric, such as a Fujitsu Flashwave® 9500 Packet Optical Networking Platform, for example. The ingress endpoint i and the egress endpoint e are each connected to the intermediary network elements n, and the intermediary network elements n are each interconnected, via edges which may each include wireless frequencies, electrical communication line(s), optical communication line(s), or some combination thereof.

When a call requires routing from the ingress endpoint i to the egress endpoint e in the example operating environment 100, it is beneficial to route the call through the shortest non-disconnected path currently available through the intermediary network elements n. As used herein, the term "shortest non-disconnected path" refers to the non-disconnected path through one or more NEs that entails the least accumulated cost according to some predefined metric. The predefined metric may include, but is not limited to, capital expenditure, operational expenditure, power consumption, latency, or distance, or some combination thereof.

Figure 2:
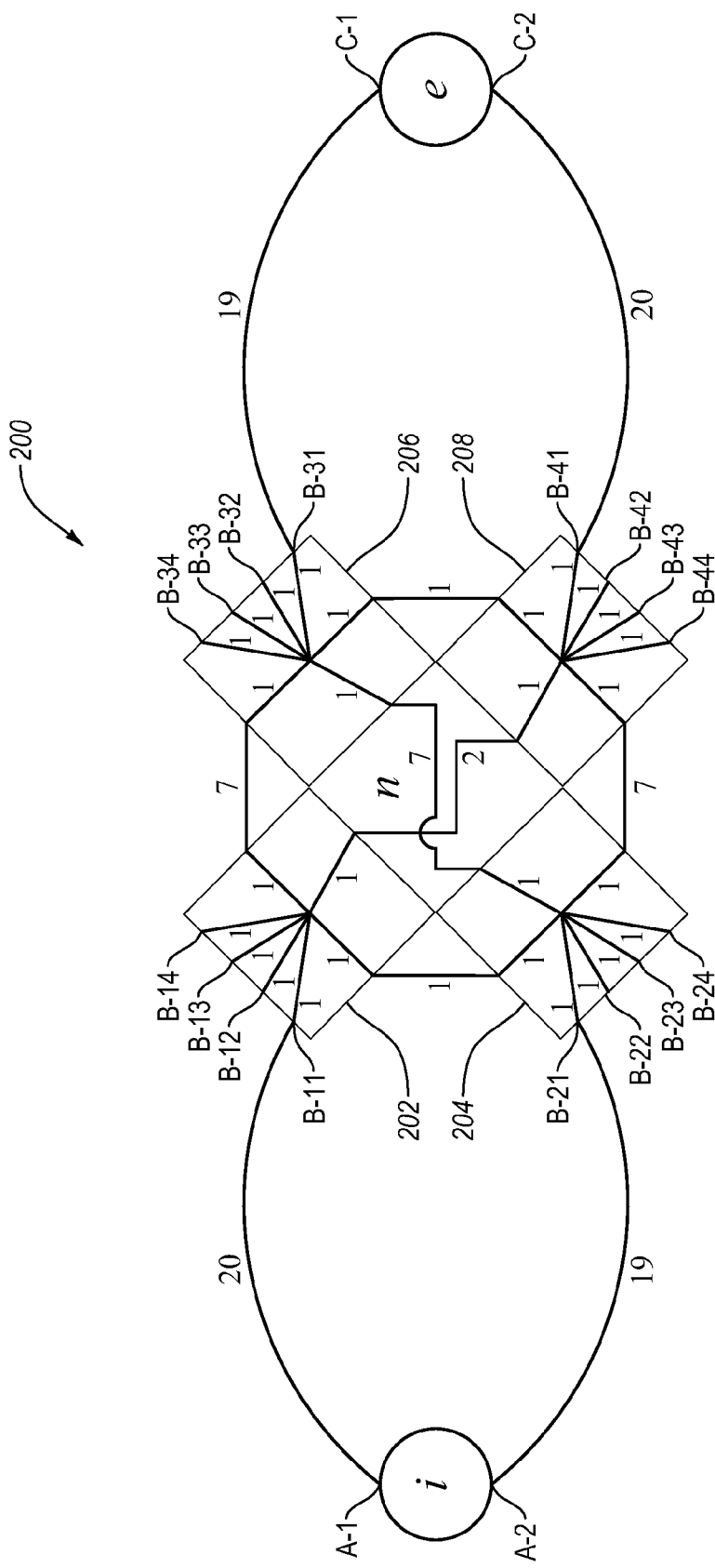
FIG. 2 schematically illustrates another example operating environment including an example network element (NE) in which embodiments of a method for routing around intra-NE disconnectivity may be effected.

FIG. 2 schematically illustrates another example operating environment 200 including an example NE n in which embodiments of a method for routing around intra-NE disconnectivity may be effected. As with the example operating environment 100, the example operating environment 200 includes an ingress endpoint i and an egress endpoint e. The ingress endpoint i includes ingress endpoints A-1 and A-2 which are connected to the NE n. The egress endpoint e includes egress endpoints C-1 and C-2 which are similarly connected to the NE n. The NE n may be an optical-transport switch as described above, for example. The NE n include a plurality of confederated shelves, with ingress endpoints B-11-B-14 and B-21-B-24 on first and second shelves 202 and 204, respectively, and with egress endpoints B-31-B-34 and B-41-B-44 on third and fourth shelves 206 and 208, respectively.

Figure 6:
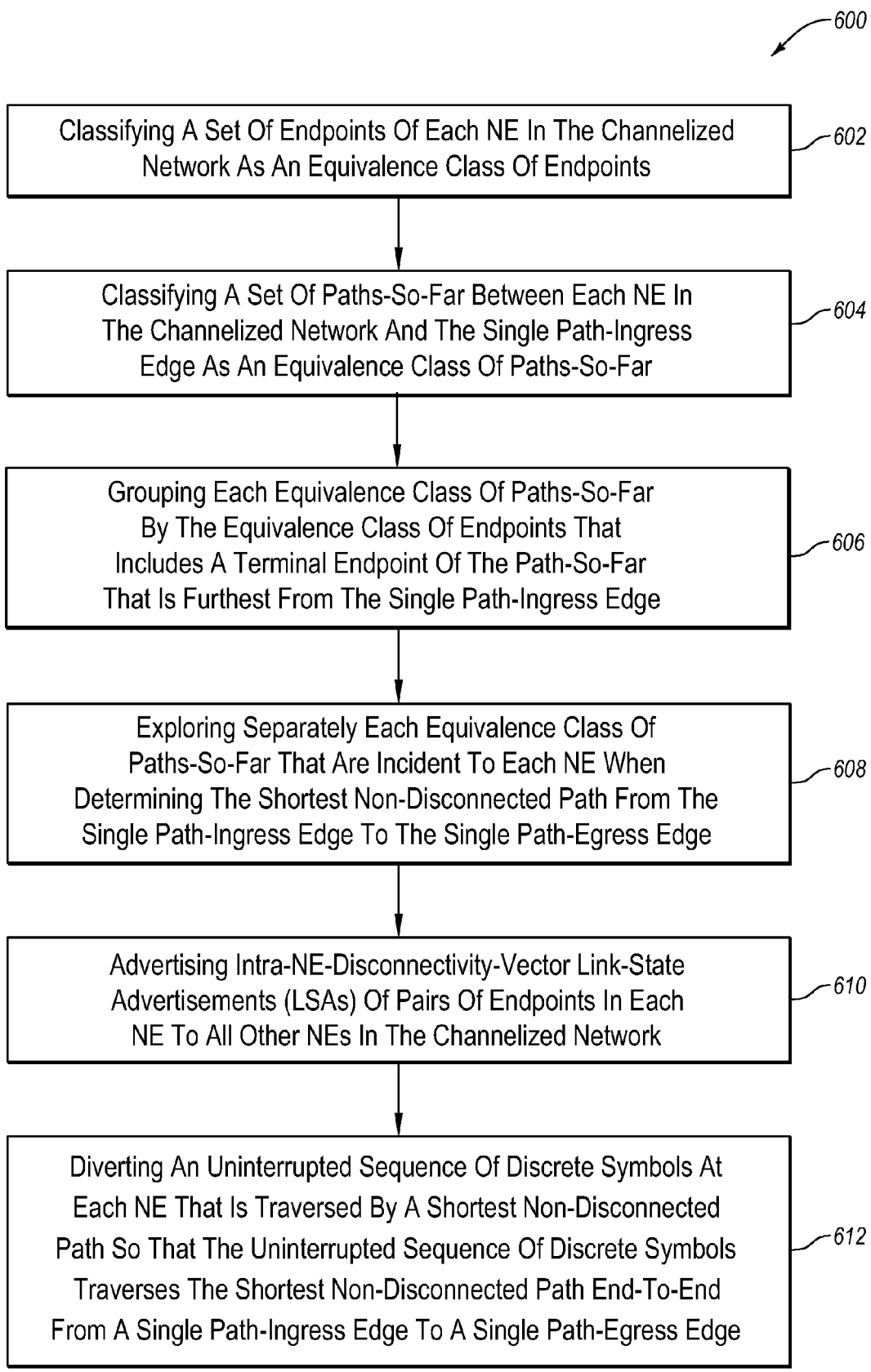
FIG. 6 is a flowchart of an example method for routing around intra-NE disconnectivity.

The example operating environment 200 also includes various edges connecting the ingress endpoint i and the egress endpoint e to the NE n, as well as intra-NE edges connecting the ingress endpoints B-11-B-14 and B-21-B-24 to the egress endpoints B-31-B-34 and B-41-B-44 within the NE n. Each of the edges of the example operating environment 200 is labeled with a cost (e.g., a cost of 1, 2, 7, 19, or 20) of routing a call through the edge. It is understood that the costs illustrated in FIG. 2 are only example costs, and various other costs that are greater than, less than, or more varied than those illustrated in FIG. 6 are possible. It is further understood that the costs illustrated in FIG. 2 may be the costs at a particular point in time, and that in many situations the costs may fluctuate depending on a variety of factors including network traffic demands on the NE n. It is still further understood that the roles "ingress endpoint" and "egress endpoint" may be momentary and quite transient. Therefore, the ingress endpoints B-11-B-14 and B-21-B-24 and the egress endpoints B-31-B-34 and B-41-B-44 may repeatedly switch roles as data directions change over time.

FIG. 3 schematically illustrates another example operating environment 300 including another example NE n in which embodiments of a method for routing around intra-NE disconnectivity may be effected. As with the example operating environment 200, the example operating environment 300 includes an ingress endpoint i with ingress endpoints A-1 and A-2 and an egress endpoint e with egress endpoints C-1 and C-2. The NE n includes a plurality of confederated shelves, with ingress endpoints B-11-B-14 and B-21-B-24 on first and second shelves 302 and 304, respectively, and with egress endpoints B-31-B-34 and B-41-B-44 and third and fourth shelves 306 and 308, respectively.

Unlike the shelves in FIG. 2, the shelves in FIG. 3 are blocking, as the first shelf 302 is only connected to the third shelf 306, and the second shelf 304 is only connected to the fourth shelf 308. It is noted that the blocking trait of the shelves in FIG. 3 may be transitory instead of permanent. For example, the blocking trait may be transitory when at a given point in time a call cannot be routed from one shelf to another due to resource exhaustion such as a lack of available bandwidth between the two shelves. In this scenario, when additional bandwidth becomes available between the two shelves, the two shelves may become non-blocking.

It is further noted that the blocking trait of the shelves in FIG. 3 may be situational depending on different categorization of characteristics of the NE and of the sought-for continuous connection between ingress endpoint i and egress endpoint e. For example, the blocking trait may be present for an attempt to establish a latency-intolerant continuous connection between ingress endpoint i and egress endpoint e, but absent when attempting to establish, at precisely the same moment in precisely the same situation, a latency-tolerant continuous connection between ingress endpoint i and egress endpoint e. In this scenario, when reduction in latency becomes available between the two shelves, the two shelves may become non-blocking.

When a call requires routing from the ingress endpoint i to the egress endpoint e in the example operating environment 200 or 300, it is beneficial to route the call through the shortest non-disconnected path currently available through the NE n. The shortest non-disconnected path may be determined using an SPS.

FIG. 4 is a flowchart of an example SPS method 400 for use in an example method for routing around intra-NE disconnectivity. The example SPS method 400 may be employed to determine the shortest non-disconnected path between the ingress endpoint i to the egress endpoint e in the example operating environment 200 or 300 of FIG. 2 or 3, respectively. The example SPS method 400 may be employed to route around intra-NE disconnectivity through the NE n of FIG. 2 or FIG. 3. Unlike the traditional Dijkstra SPS, the example SPS method 400 routes around intra-NE disconnectivity without prematurely pruning the NE n as not having a viable intra-NE path while a viable intra-NE path actually exits.

The example SPS method 400 may be employed to route around intra-NE disconnectivity in a NE of a channelized network. As used herein, the term "channelized network" refers to a network where each channel in the network is partitioned independently, where the temporal-spatial location itself of the partition, and not the content within the partition, is what implicitly identifies the switchable traffic flow of an uninterrupted sequence of discrete symbols. The NE may include one or more internally non-blocking switch-fabrics each having a plurality of endpoints with interconnects between any two internally non-blocking switch-fabrics. The example SPS method 400 may be performed in the channelized network to determine the shortest non-disconnected path in the channelized network from a single path-ingress edge to a single path-egress edge so as to convey an uninterrupted sequence of discrete symbols, such as appear in a frame of a telephone call, end-to-end from the single path-ingress edge to the single path-egress edge. The shortest non-disconnected path in the channelized network from the single path-ingress edge to the single path-egress edge may either traverse an NE with intra-NE disconnectivity via a different pair of optical ports or entirely bypassing the NE with intra-NE disconnectivity, whichever is more optimum.

The example SPS method 400 may be accomplished by collectively considering a set of endpoints of each NE in the channelized network as an equivalence class of endpoints and collectively considering a set of edges between pairs of NEs in the channelized network as an equivalence class of edges. Further, the example SPS method 400 may consider each equivalence class of edges that are incident to the NE separately when determining the shortest non-disconnected path from the single path-ingress edge to the single path-egress edge.

Each equivalence class of edges at each NE in the example SPS method 400 may have a fully-explored indicator. As used herein, the term "fully-explored indicator" refers to a binary 'true/false' indicator corresponding to an NE that indicates whether each ingress and egress edge of the equivalent class of endpoints has been fully explored during an SPS method. As used herein, the term "explore" refers to the process of calculating the costs associated with traversing the edges between each NE and between each equivalence class of endpoints in a channelized network during an SPS method. The "exploring" or "exploration" referred to herein results in the determination of a shortest non-disconnected path currently available in a channelized network. Also, the edges incident to NEs in various different directions may be explored incrementally in opportunistic depth-first order, as governed by a priority-queue of non-disconnected paths explored so far that is prioritized by shortest non-disconnected path so far. As used herein, the term "path-so-far" refers to a path explored during an SPS method. Each "path-so-far" is associated with a cost of traversing from the single path-ingress edge of the SPS method to a terminal endpoint of the path-so-far. Each "path-so-far" may be extended via additional exploration in order to arrive at the single path-egress edge from the single path-ingress edge of the SPS method. Further, each endpoint of an edge may be a member of an equivalence-class of edges at a NE of the endpoint. Also, the edges between NEs are considered a graph of the first order in the example SPS method 400 while the edges between endpoints on a given NE are considered a graph of the second order in the SPS. Hence, the network of NEs can be considered as a graph of the first order whose first-order vertexes are each in turn a graph of the second order. Therefore, such first-order vertexes may be each referred to herein to as a graph-within-vertex, which is a shorthand for a second-order graph (which represents one NE's intra-NE disconnectivity) within a first-order vertex (which represents the inter-NE network of a telecommunications-industry service-provider). Further, up-to-x-shortest non-disconnected paths within each NE may be employed as the basis for determining an intra-NE disconnectivity within the NE. In one example, in at least some example embodiments, x can be equal to three (3).

For example, in at least some example implementations, each of the example operating environments 200 and 300 may be a channelized network with the edges connecting the ingress endpoint i and the egress endpoint e to the NE n being optical communication lines and the intra-NE edges being electrical communication lines. The edges connecting the ingress endpoint i and the egress endpoint e to the NE n may be considered a graph of the first order in the example SPS method 400 while the intra-NE edges between endpoints of the NE n may be considered a graph of the second order in the example SPS method 400.

In the example SPS method 400, the network is considered as a graph $g \equiv (V,E)$, where V is a set of zero or more graph-within-vertex and where E is a set of zero or more undirected edges. A single path-ingress edge $e_i \in E$ is designated, which is a member of an equivalence class $c_i$, and a single path-egress edge $e_e \in E$ is designated, which is a member of an equivalence class $c_e$. Each graph g has a priority-queue Q that is composed of a tuple $(m_p, p)$, where each edge has an accumulated metric value $m_p$ for the shortest non-disconnected path so far and where p is a path $v_i(ev)^*$ that has been explored so far, $v \in V$ and $e \in E$.

Prior to the performance of the example SPS method 400 on a NE, the tentative value for $c_i$'s accumulated metric $m_i$ is initially set to zero, all non-$c_i$ equivalence-classes throughout all vertexes' tentative value for accumulated metric is initially set to infinity, Q is initially set to $\{(m_i, v_i)\}$ with $m_i$ as the priority-key and $v_i$ as the path so far along that branch of the tree-walk of the graph, all non-$c_i$ equivalence-classes' fully-explored indicators are initially set to false, and all edges' explored indicators are initially set to false.

To commence, at block 402, $(m_\uparrow, p_\uparrow)$ is popped from Q. Then, at block 404, within $p_\uparrow$, $p_\uparrow$'s most-recently-appended vertex $v_{\uparrow,L}$ is identified. Next, at block 406, within $p_\uparrow$, $p_\uparrow$'s second-most-recently-appended vertex $v_{\uparrow,L2}$ is identified. Then, at block 408, it is determined whether $v_{\uparrow,L}$'s intra-NE connectivity vector for ($e_{\uparrow L2,j}$'s equivalence-class $c_{\uparrow,L2,j}$, $e_{\uparrow,L,j}$'s equivalence-class $c_{\uparrow,L,j}$) indicates that $e_{\uparrow,L2,j}$ has disconnectivity to $e_{\uparrow,L,j}$ within $v_{\uparrow,L}$. Next, if "Yes" at block 408, at block 410, $e_{\uparrow,L,j}$ is skipped, and the example SPS method 400 returns to block 402. Otherwise, if "No" at block 408, at block 412, it is determined whether c↑,L,j is not already fully-explored.

Next, if "Yes" at block 412, at block 414, $(m\updownarrow, p\updownarrow)$ is inserted into Q, where $m\updownarrow \equiv m_\uparrow + e_{\uparrow,L,j}$'s $m + v_j$'s m, and where $p\updownarrow \equiv p_\uparrow \cdot e_{\uparrow,L,j} * v_j$. Then, if "No" at block 412, or after block 414, at block 416, it is determined whether $e_{\uparrow,L,j}$ was $c_j$'s final remaining unexplored edge.

Next, if "Yes" at block 416, at block 418, then $c_j$'s fully-explored indicator is set to true. Then, if "No" at block 416, or after block 418, at block 420, $e_{\uparrow,L,j}$'s explored indicator is set to true.

Next, at block 422, it is determined whether Q's current tuple $(m_\uparrow, p_\uparrow)$ with the least accumulated metric has $v_e$ as the vertex that was most-recently appended to $p_\uparrow$. Then, if "Yes" at block 422, at block 424, the example SPS method 400 finishes. Otherwise, if "No" at block 22, the example SPS method 400 returns to block 402.

Using the example SPS method 400, the shortest non-disconnected path between the ingress endpoint i and the egress endpoint e in the example operating environment 200 of FIG. 2 can be determined. In particular, the example SPS method 400 may be employed to determine that the shortest non-disconnected path from the ingress endpoint i to the egress endpoint e of FIG. 2 is a path of cost forty-six (46) through endpoints A-1, B-11, B-41, and C-2. Similarly, the example SPS method 400 may be employed to determine that the shortest non-disconnected path from the ingress endpoint i to the egress endpoint e of FIG. 3 is a path of cost one-hundred twelve (112) through endpoints A-2, B-21, B-41, and C-2. In both cases, even though the first path explored is determined not to be the shortest non-disconnected path, the entire NE n is not prematurely pruned but a different equivalence class of edges of this NE is instead re-explored to find an alternative and shorter non-disconnected path through the NE n.

During the performance of the example SPS method 400, it may be beneficial for the capabilities of the various NEs of the network to be communicated between NEs. While communication of these capabilities may be beneficial, the data volume required to communicate these capabilities may quickly become unmanageable. Therefore, it may further be beneficial to reduce the size of the data used to communicate these capabilities prior to sending the data between NEs.

FIGS. 5A-5H illustrate a process flow for communicating a compacted declaration of capabilities of an NE using link-state advertisements (LSAs) for use in an example method for routing around intra-NE disconnectivity. In particular, FIGS. 5A-5H illustrate how the data used to communicate various capabilities of a NE may be reduced in size into intra-NE-disconnectivity-vector LSAs that may then be employed in performing an SPS to determine the shortest non-disconnected path from a single path-ingress edge to a single path-egress edge. As used herein, the term "link-state advertisement" or "LSA" refers to one or more packets of information regarding the capabilities of an NE that is transmitted by the NE to other NEs.

During the process flow of FIGS. 5A-5H, each NE may advertise intra-network-element-disconnectivity-vector LSAs to all other NEs. As noted previously, the intra-NE-disconnectivity-vector LSAs may be reduced in size. In at least some example embodiments, the intra-NE-disconnectivity-vector LSAs may represent a multi-dimensional coordinate system. For example, the intra-NE-disconnectivity-vector LSAs may represent a six-dimensional coordinate system, although fewer than or greater than six-dimensions of capabilities may be represented by the intra-NE-disconnectivity-vector LSAs.

Figure 5A:
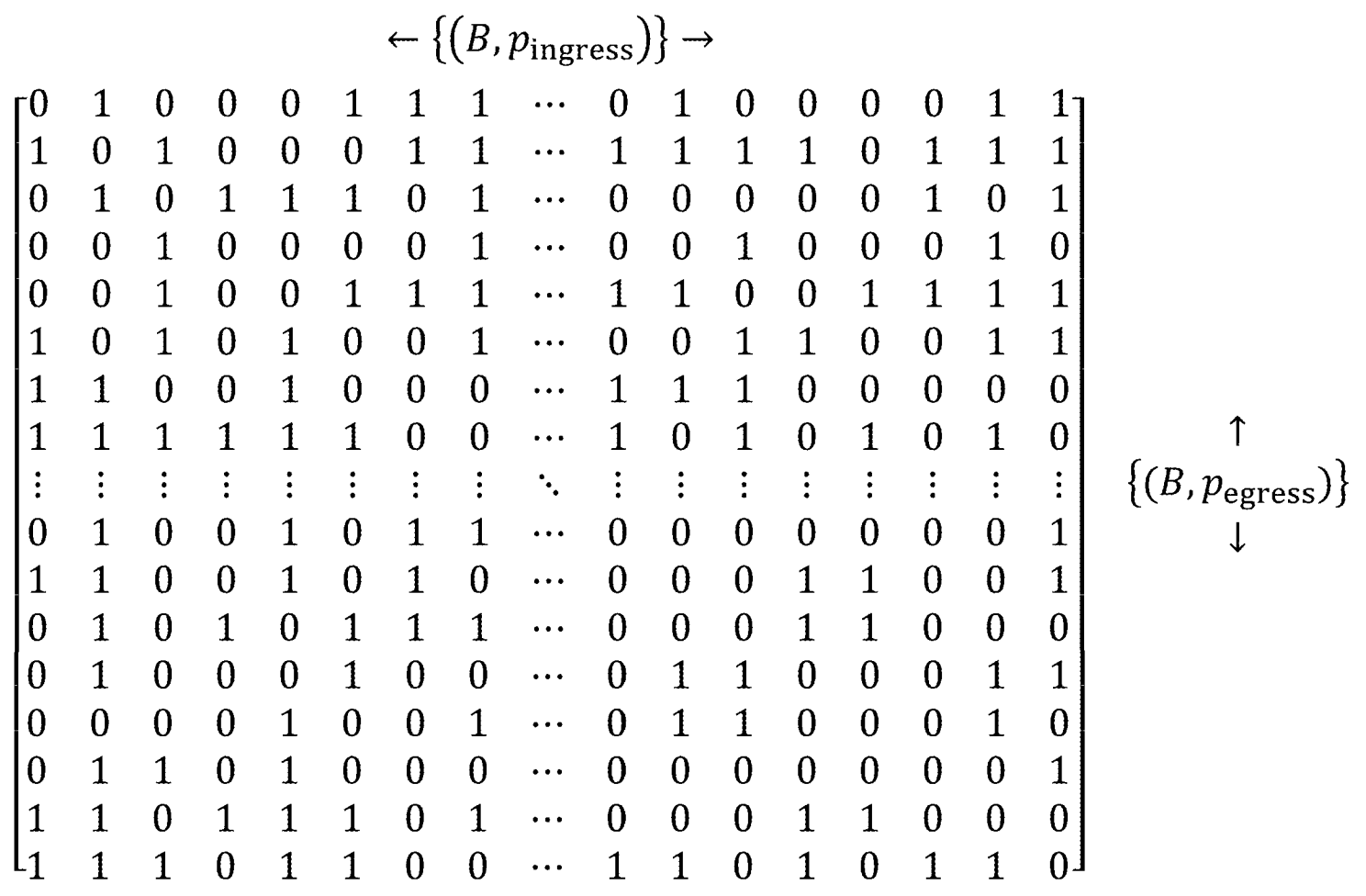

For example, the matrix of FIG. 5A represents a six-dimensional matrix of information for a NEs before any reduction in the size of the data.

Figure 5B:
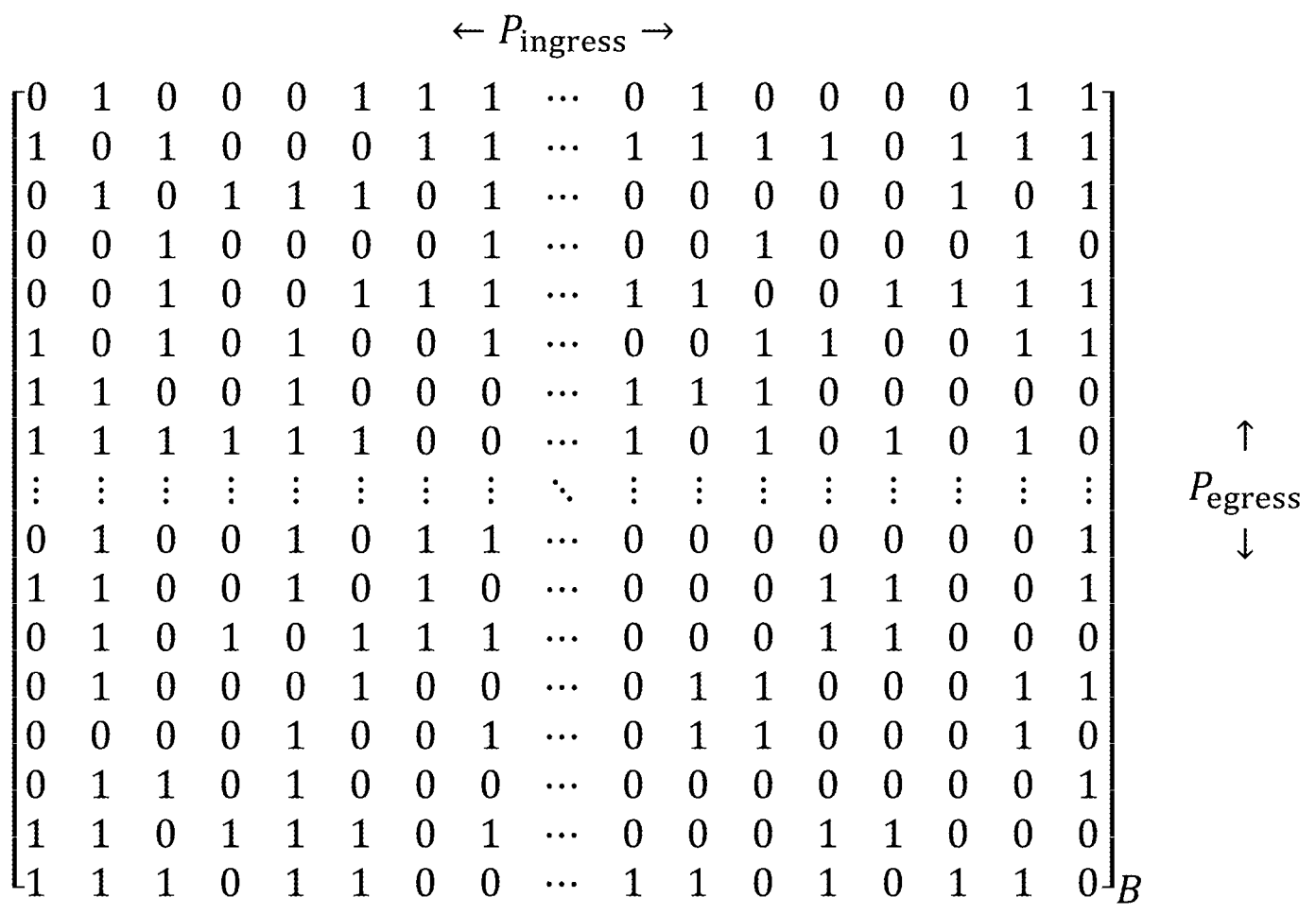

The matrix of FIG. 5B represents the matrix of information for the NE of FIG. 5A after having been reduced by an operation of partitioning the matrix into information corresponding to a single resource block B. A resource block B is a resource that is internally non-blocking but may be blocking with respect to other resource blocks. A resource block B may be switch fabric such as a shelf in the NEs n described above in connection with FIGS. 2 and 3, for example.

The matrix of FIG. 5C represents the matrix of information for the NE of FIG. 5B after having been reduced by an operation of decomposition by pair of endpoints to match protocol and data rate.

The matrix of FIG. 5D represents the matrix of information for the NE of FIG. 5C after having been reduced by an operation of decomposition by pair of endpoints that would be intra-NE connected if all channels throughout the NE were idle.

Figure 5E:
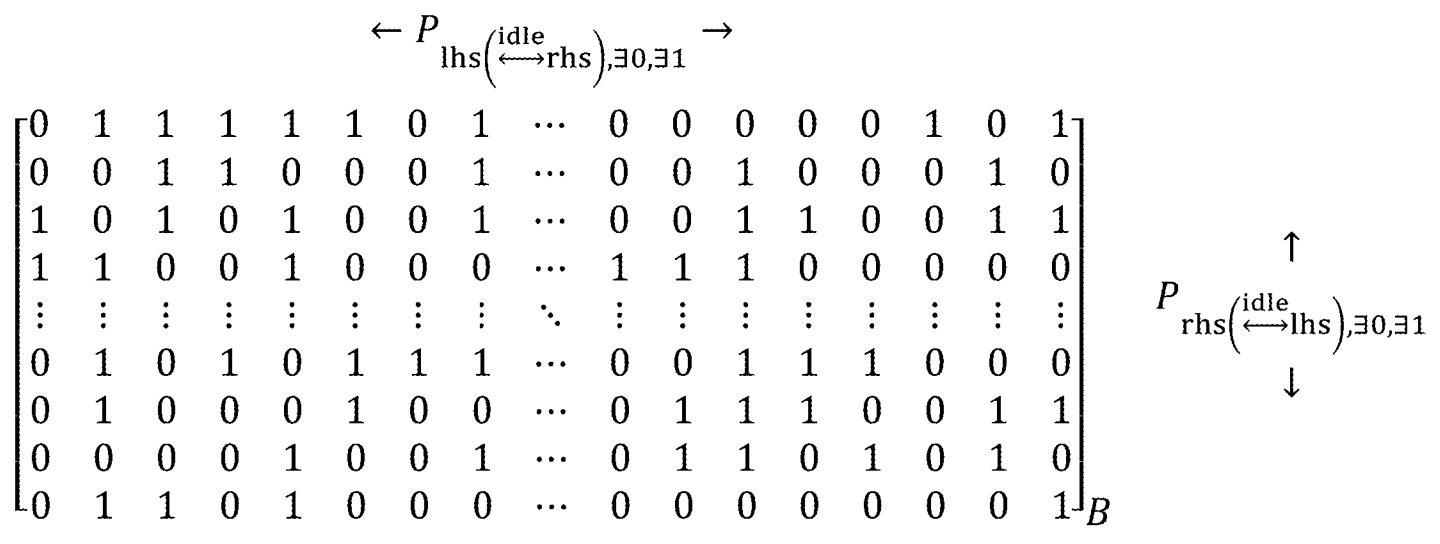

The matrix of FIG. 5E represents the matrix of information for the NE of FIG. 5D after having been reduced by an operation of decomposition by pair of endpoints where each row contains at least one 0 and at least one 1.

The matrix of FIG. 5F represents the matrix of information for the NE of FIG. 5E after having been reduced by an operation of decomposition by pair of endpoints partitioned into the same subtype and subclass. This decomposition may be performed where each subtype and subclass 1) share self-similar data-plane technology, 2) share an identical (traversed) tributary-slot interchange set (TSI-set), 3) share an equivalent administrative-group/color, 4) share an identical protection-type, or 5) share an equivalent shared-risk link-group set (SRLG-set), or some combination thereof. As used herein, the term "data-plane" refers to the first of three planes in a network that includes the state-machine that conveys the channelized rivers of bits that is typically effected using hardware. The second of the three planes is the control-plane which is the controlled manipulation the flow of the channelized rivers in the data-plane that traditionally effecting using some hardware but mainly software. The third of the three planes is the management-plane which is the service-provider's orifice to manipulate the control-plane. As used herein, the term "TSI" is another name for an internally nonblocking channelized switch-fabric. As used herein, the term "administrative group/color" refers to the concept of color in graph theory and is a declaration by a service-provider to demarcate partitions that are to be kept separate. For example, a service-provider may keep partitions separate in order to administer its proprietary business, such as keeping traffic for two competitors entirely separate (e.g., diversely routed among two disjoint sets of NEs) for legal reasons. As used herein, the term "protection-type" may refer to protection types such as, but not limited to: unprotected, 1+1 segment-by-segment protection (e.g. SONET-SDH's LAPS), 1+1 end-to-end protection (e.g. OTN's SNC family of variants), gurney-shaped mesh protection (e.g. IEEE 802.11s), or arbitrary-mesh protection (e.g. as disclosed in U.S. Pat. No. 7,308,198, the disclosure of which is incorporated herein by reference in its entirety). As used herein, the term "SRLG-set" refers to an integer identifier that names a set of interconnects that share failure-mode characteristics, such as being collocated within the same fiber-bundle that can all be severed at the same time (e.g. by a backhoe cut) or being collocated in the same building that can all burn at the same time.

The matrix of FIG. 5G represents the matrix of information for the NE of FIG. 5F after having been reduced by an operation of decomposition into a column-vector of row-vectors.

The matrix of FIG. 5H represents the matrix of information for the NE of FIG. 5G after having been reduced by an operation of partitioning into the same supertype and superclass. This partitioning may be accomplished among multiple matrixes by rolling up rows whose connectivity is known at hardware engineering time to behave identically, available bandwidth permitting. Because such supertyping is opportunistic based on deducing shared fate due to observing shared fate-inducing characteristics, super typing is sometimes referred to as duck typing, where if it quacks and swims like a duck, then it is deemed to be a duck.

Figure 7:
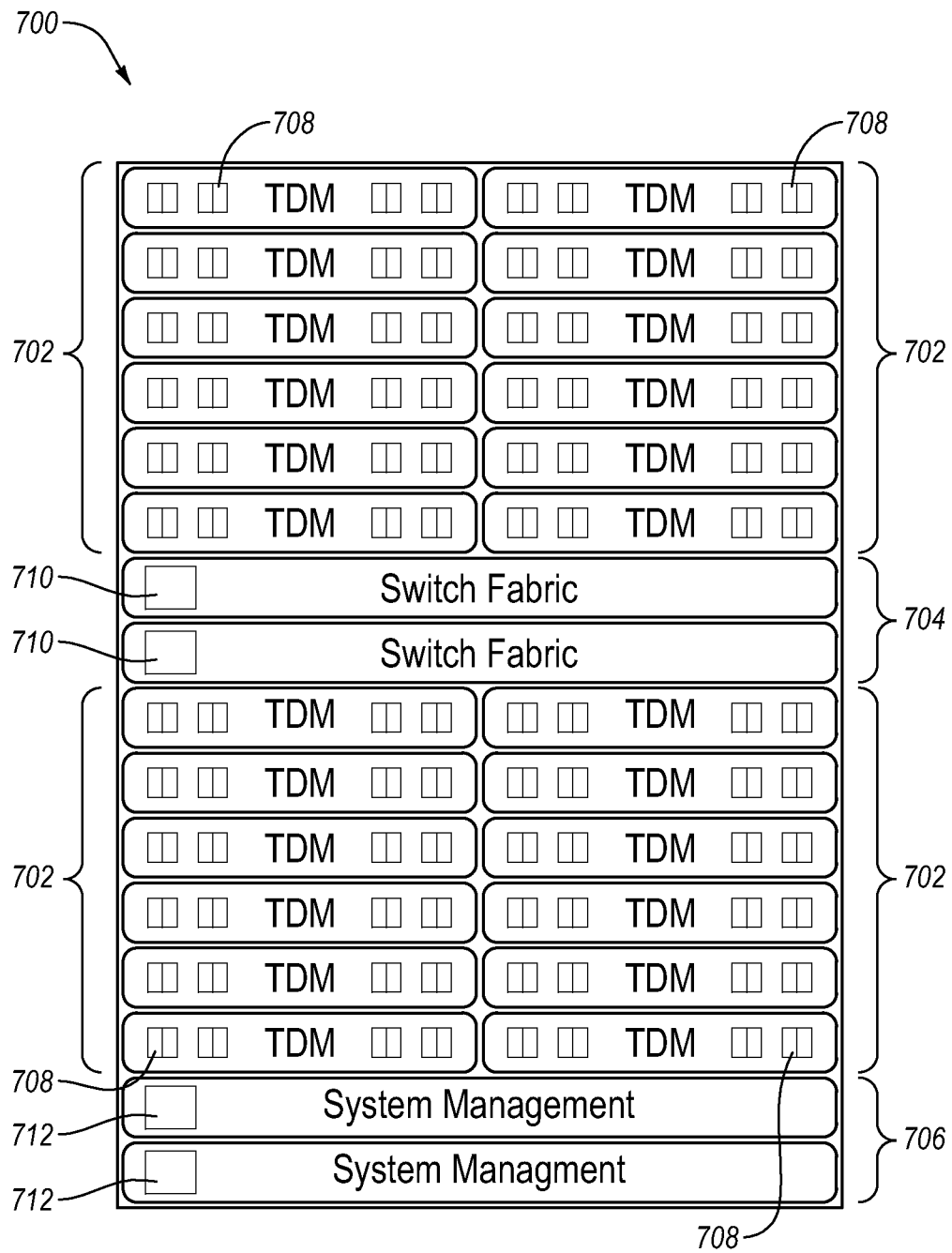
FIG. 7 schematically illustrates an example optical-transport switch in which the example method for routing around intra-NE disconnectivity of FIG. 6 may be effected.

FIG. 6 is a flowchart of an example method 600 for routing around intra-NE disconnectivity. The example method 600 may be performed as part of the SPS method 400 of FIGS. 4A-4B. FIG. 7 schematically illustrates an example optical-transport switch 700 in which the example method 600 of FIG. 6 may be effected. The example optical-transport switch 700 may function as one of the shelves 202-208 of FIG. 2, for example. The example optical-transport switch 700 includes TDM cards 702, switch-fabric cards 704, and system management cards 706. Each of the TDM cards 702 includes, among other things, one or more optical ports 708. For example, if the example optical-transport switch 700 is functioning as the shelf 202 of FIG. 2, the optical ports 708 may function as the ingress endpoints B-11-B-14, while others optical ports 708 of the TDM cards 702 may function as egress endpoints. Each of the switch-fabric cards 704 includes, among other things, one or more special-purpose processors 710. Each of the system management cards 706 includes, among other things, one or more special-purpose processors 712. The special-purpose processors 710 and 712 are configured to perform various functions during the performance of method 600.

To commence the example method 600, at block 602, a set of endpoints of each NE in a channelized network is classified as an equivalence class of endpoints. For example, the special-purpose processors 712 of one or both of the system management cards 706 may classify the optical ports 708 of the example optical-transport switch 700, as well as all other endpoints of the particular NE to which the optical-transport switch 700 belongs, as an equivalence class of endpoints. Further, the set of endpoints of each other relevant NE between a single path-ingress edge to the single path-egress edge may also be classified as an equivalence class of endpoints, as determined by the interconnects within and among the TDM cards 702 to and among the switch-fabric cards 704 and especially to and among the switch-fabric's special-purpose processors 710.

Next, at block 604, a set of paths-so-far between each NE in the channelized network and the single path-ingress edge is classified as an equivalence class of edges. For example, the special-purpose processors 712 of one or both of the system management cards 706 may classify a set of paths-so-far between each relevant NE in the channelized network and the single path-ingress edge as an equivalence class of paths-so-far.

Then, at block 606, each equivalence class of paths-so-far is grouped by the equivalence class of endpoints that includes a terminal endpoint of the path-so-far that is furthest from the single path-ingress edge. For example, the special-purpose processors 712 of one or both of the system management cards 706 may group each equivalence class of paths-so-far by the equivalence class of endpoints that includes a terminal endpoint of the path-so-far that is furthest from the single path-ingress edge.

Then, at block 608, each equivalence class of paths-so-far that are incident to each NE is explored separately. For example, the special-purpose processors 712 of one or both of the system management cards 706 may explore separately each equivalence class of paths-so-far that are incident to each NE.

Next, at block 610, intra-NE-disconnectivity-vector link-state advertisements (LSAS) of pairs of endpoints in each NE are advertised to all other NEs in the channelized network. For example, the special-purpose processors 712 of one or both of the system management cards 706 may advertise intra-NE-disconnectivity-vector link-state advertisements (LSAS) of pairs of endpoints in each NE to all other NEs in the channelized network.

Next, at block 612, an uninterrupted sequence of discrete symbols is diverted at each NE that is traversed by a shortest non-disconnected path so that the uninterrupted sequence of discrete symbols traverses the shortest non-disconnected path end-to-end from a single path-ingress edge to the single path-egress edge. For example, the special-purpose processors 710 of one or both of the switch-fabric cards 704 may divert an uninterrupted sequence of discrete symbols through the example optical-transport switch 700 from one of the optical ports 708 to another of the optical ports 708. Similarly, other similar switch-fabric cards may divert the uninterrupted sequence of discrete symbols through other ports of the same NE and other NEs that are traversed by a shortest non-disconnected path. The end result of this diverting is that the uninterrupted sequence of discrete symbols traverses the shortest non-disconnected path end-to-end from a single path-ingress edge to the single path-egress edge.

Figure 4A:
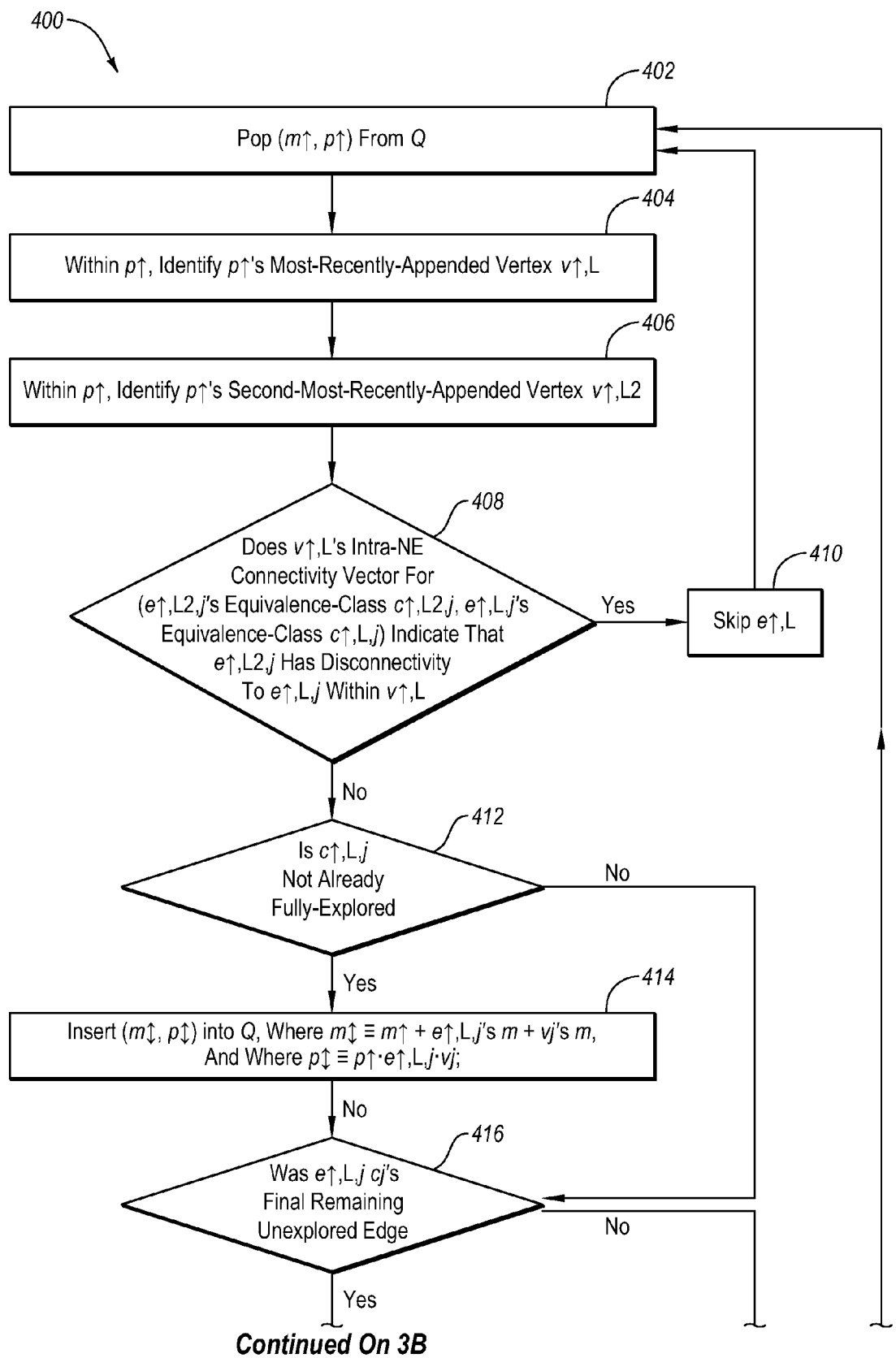
FIGS. 4A and 4B are flowcharts of an example SPS method for use in an example method for routing around intra-NE disconnectivity.
Figure 4B:
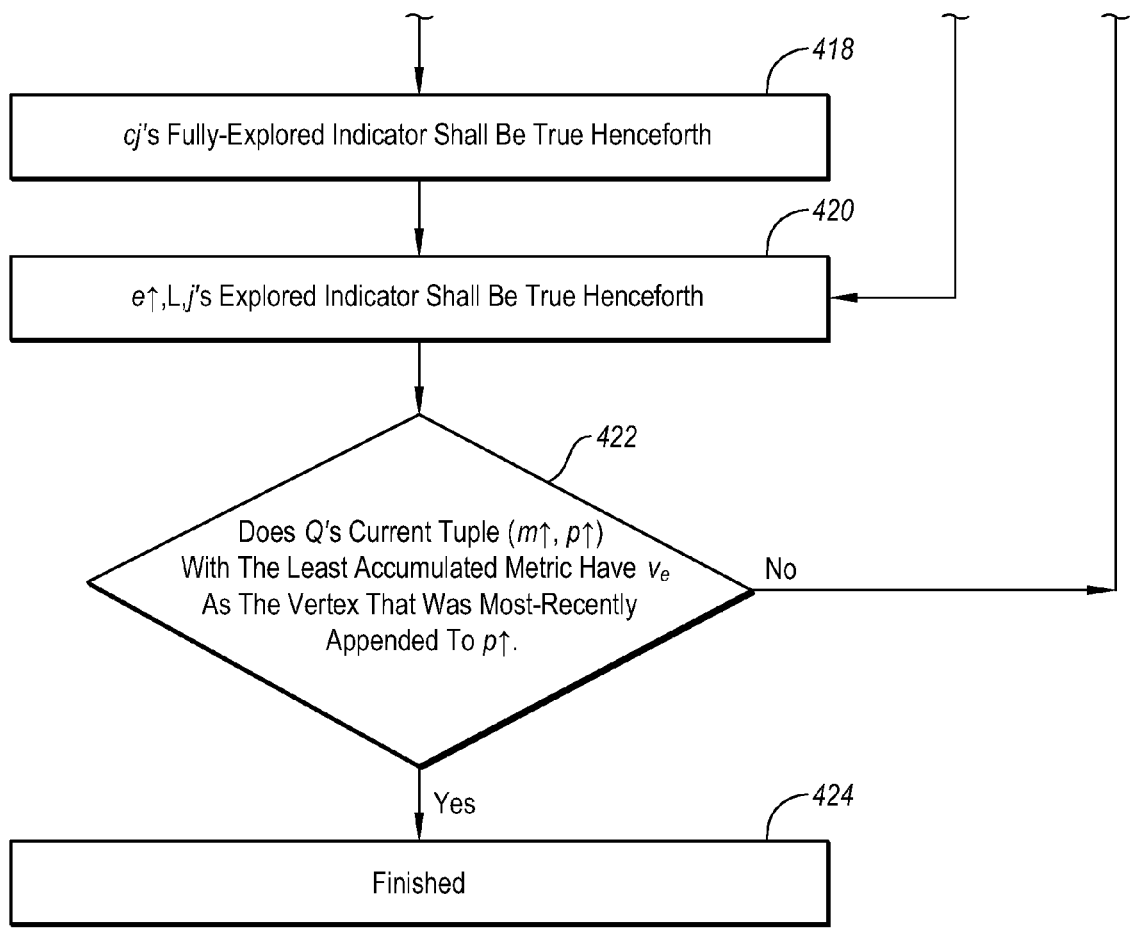

As noted previously, the steps 602-612 may be effected during the performance of the SPS method 400 of FIGS. 4A-4B. Further, the step 610 may be effected according to the process flow of FIGS. 5A-5H. It is noted that the SPS method 400 is but one specific example of an SPS method that may be employed during the performance of the steps 602-612, and other SPS methods may be employed during the performance of the steps 602-612. It is also noted that although the method 600 has been described herein as being performed by various components of the example optical-transport switch 700, it is understood that the example optical-transport switch 700 is only one example device in which the example method 600 of FIG. 6 may be effected. It is further understood that a single device may perform the steps of the example method 600 of FIG. 6 for multiple NEs or multiple devices may perform the steps of the example method 600 of FIG. 6 for a single NE. Therefore, the example method 600 of FIG. 6 is not limited to being performed by the example optical-transport switch 700 nor by an optical-transport switch that is configured similar to the example optical-transport switch 700.

One skilled in the art will appreciate that, for the processes and methods disclosed herein, the functions performed in the processes and methods may be effected in differing order. Furthermore, the outlined steps and operations are only provided as examples, and some of the steps and operations may be optional, combined into fewer steps and operations, or expanded into additional steps and operations without detracting from the disclosed embodiments.

Thus, the example methods for routing around intra-NE disconnectivity disclosed herein accomplish routing through one or more NEs while enabling the ability to hierarchically classify resources by behavior traits, without unnecessarily dividing any NE for connectivity purposes, and without prematurely pruning any NE as not having a viable intra-NE path while a viable intra-NE path actually exits.

The embodiments described herein may include the use of a special-purpose or general-purpose computer including various computer hardware or software modules, as discussed in greater detail below.

Embodiments described herein may be effected using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable media such as RAM, ROM, EEPROM, CD-ROM or other optical disk storage, magnetic disk storage or other magnetic storage devices, or any other non-transitory medium which may be used to carry or store desired program code means in the form of computer-executable instructions or data structures and which may be accessed by a general-purpose or special-purpose computer. Combinations of the above should also be included within the scope of computer-readable media.

Computer-executable instructions comprise, for example, instructions and data which cause a general-purpose computer, special-purpose computer, or special-purpose processor to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be effected as objects or processes that execute on the computing system (e.g., as separate threads). While the system and methods described herein may be effected in software, applications in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the scope of the claimed invention.

What is claimed is:

1. A method for performing a shortest-path-search (SPS) to determine a shortest non-disconnected path in a channelized network from a single path-ingress edge to a single path-egress edge through one or more network elements (NEs), the method comprising:
    classifying, by one or more processors, a set of endpoints of each NE in the channelized network as an equivalence class of endpoints, each NE including one or more internally non-blocking switch-fabrics each having a plurality of endpoints with interconnects between any two internally non-blocking switch-fabrics;
    classifying, by the one or more processors, a set of paths-so-far between each NE in the channelized network and the single path-ingress edge as an equivalence class of paths-so-far;
    grouping, by the one or more processors, each equivalence class of paths-so-far by the equivalence class of endpoints that includes a terminal endpoint of a path-so-far that is furthest from the single path-ingress edge;
    exploring, by the one or more processors, separately each equivalence class of paths-so-far that are incident to each NE when determining the shortest non-disconnected path from the single path-ingress edge to the single path-egress edge; and
    routing data from the single path-ingress edge to the single path-egress edge through the shortest non-disconnected path.

2. The method as recited in claim 1, wherein each equivalence class of paths-so-far at each NE has a fully-explored indicator.

3. The method as recited in claim 1, wherein edges incident to NEs in various different directions are explored incrementally in opportunistic depth-first order, as governed by a priority-queue of non-disconnected paths explored so far that is prioritized by shortest non-disconnected paths-so-far.

4. The method as recited in claim 1, wherein each endpoint of an edge is a member of an equivalence-class of paths-so-far at an NE of the endpoint.

5. The method as recited in claim 1, wherein the edges between NEs are considered a first graph of the first order in the SPS while the edges between endpoints on a given NE are considered a second graph of the second order in the SPS.

6. The method as recited in claim 1, further comprising determining an intra-network element (intra-NE) disconnectivity within the NE based on up-to-3-shortest non-disconnected paths within each NE.

7. The method as recited in claim 1, wherein each NE advertises intra-network element (intra-NE)-disconnectivity-vector link-state advertisements (LSAs) to all other NEs.

8. The method as recited in claim 7, wherein the intra-NE-disconnectivity-vector LSAs are reduced in size.

9. The method as recited in claim 8, wherein the intra-NE-disconnectivity-vector LSAs represent a multi-dimensional coordinate system.

10. The method as recited in claim 8, wherein the intra-NE-disconnectivity-vector LSAs represent a six-dimensional coordinate system.

11. The method as recited in claim 1, wherein the SPS is performed while diverting around intra-NE disconnectivity in the one or more NEs of the channelized network so as to convey an uninterrupted sequence of discrete symbols end-to-end from the single path-ingress edge to the single path-egress edge.

12. A method for routing around intra-network element (intra-NE) disconnectivity in one or more network elements (NEs) of a channelized network, the method comprising:
    performing a shortest-path-search (SPS) to determine a shortest non-disconnected path in the channelized network from a single path-ingress edge to a single path-egress edge through the one or more of the NEs so as to convey an uninterrupted sequence of discrete symbols end-to-end from the single path-ingress edge to the single path-egress edge, each NE comprising one or more internally non-blocking switch-fabrics each having a plurality of endpoints with interconnects between any two internally non-blocking switch-fabrics, the SPS including:
    classifying a set of endpoints of each NE in the channelized network as an equivalence class of endpoints;
    classifying a set of paths-so-far between each NE in the channelized network and the single path-ingress edge as an equivalence class of paths-so-far;
    grouping each equivalence class of paths-so-far by the equivalence class of endpoints that includes a terminal endpoint of a path-so-far that is furthest from the single path-ingress edge;
    advertising intra-NE-disconnectivity-vector link-state advertisements (LSAs) of pairs of endpoints in each NE to all other NEs in the channelized network; and
    diverting the uninterrupted sequence of discrete symbols at each NE that is traversed by the shortest non-disconnected path so that the uninterrupted sequence of discrete symbols traverses the shortest non-disconnected path end-to-end from the single path-ingress edge to the single path-egress edge.

13. The method as recited in claim 12, further comprising determining an intra-network element (intra-NE) disconnectivity within each NE based on up-to-3-shortest non-disconnected paths within the corresponding NE.

14. The method as recited in claim 12, wherein each NE advertises intra-network element (intra-NE)-disconnectivity-vector link-state advertisements (LSAs) to all other NEs.

15. The method as recited in claim 14, wherein the intra-NE-disconnectivity-vector LSAs represent a multi-dimensional coordinate system.

16. The method as recited in claim 15, wherein the multi-dimensional coordinate system represented by the intra-NE-disconnectivity-vector LSAs are reduced using one or more of the following operations: decomposition by pair of endpoints to match protocol and data rate; decomposition by pair of endpoints that would be intra-NE connected if all channels throughout the NE were idle; decomposition by pair of endpoints where each row contains at least one 0 and at least one 1; decomposition by pair of endpoints partitioned into the same subtype and subclass; decomposition into a column-vector of row-vectors; and partitioning into the same supertype and superclass.

17. The method as recited in claim 12, wherein the SPS further includes exploring separately each equivalence class of paths-so-far that are incident to each NE when determining the shortest non-disconnected path from the single path-ingress edge to the single path-egress edge.

18. A non-transitory computer-readable medium storing a program that causes a processor to execute a method for performing a shortest-path-search (SPS) to determine a shortest non-disconnected path in a channelized network from a single path-ingress edge to a single path-egress edge through one or more network elements (NEs), the method comprising:

classifying a set of endpoints of each NE in the channelized network as an equivalence class of endpoints, each NE including one or more internally non-blocking switch-fabrics each having a plurality of endpoints with interconnects between any two internally non-blocking switch-fabrics;

classifying a set of paths-so-far between each NE in the channelized network and the single path-ingress edge as an equivalence class of paths-so-far;

grouping each equivalence class of paths-so-far by the equivalence class of endpoints that includes a terminal endpoint of a path-so-far that is furthest from the single path-ingress edge; and exploring separately each equivalence class of paths-so-far that are incident to each NE when determining the shortest non-disconnected path from the single path-ingress edge to the single path-egress edge.

19. A non-transitory computer-readable medium storing a program that causes a processor to execute a method for routing around intra-network element (intra-NE) disconnectivity in one or more network elements (NEs) of a channelized network, the method comprising:

performing a shortest-path-search (SPS) to determine a shortest non-disconnected path in the channelized network from a single path-ingress edge to a single path-egress edge through the one or more of the NEs so as to convey an uninterrupted sequence of discrete symbols end-to-end from the single path-ingress edge to the single path-egress edge, each NE comprising one or more internally non-blocking switch-fabrics each having a plurality of endpoints with interconnects between any two internally non-blocking switch-fabrics, the SPS including:

classifying a set of endpoints of each NE in the channelized network as an equivalence class of endpoints;

classifying a set of paths-so-far between each NE in the channelized network and the single path-ingress edge as an equivalence class of paths-so-far;

grouping each equivalence class of paths-so-far by the equivalence class of endpoints that includes a terminal endpoint of a path-so-far that is furthest from the single path-ingress edge;

advertising intra-NE-disconnectivity-vector link-state advertisements (LSAs) of pairs of endpoints in each NE to all other NEs in the channelized network; and diverting the uninterrupted sequence of discrete symbols at each NE that is traversed by the shortest non-disconnected path so that the uninterrupted sequence of discrete symbols traverses the shortest non-disconnected path end-to-end from the single path-ingress edge to the single path-egress edge.

* * * * *